(No Model.)
S. DENNIS, Dec'd.
D. S. DENNIS, Administrator.
ANIMAL TRAP.
No. 437,179. Patented Sept. 30, 1890.
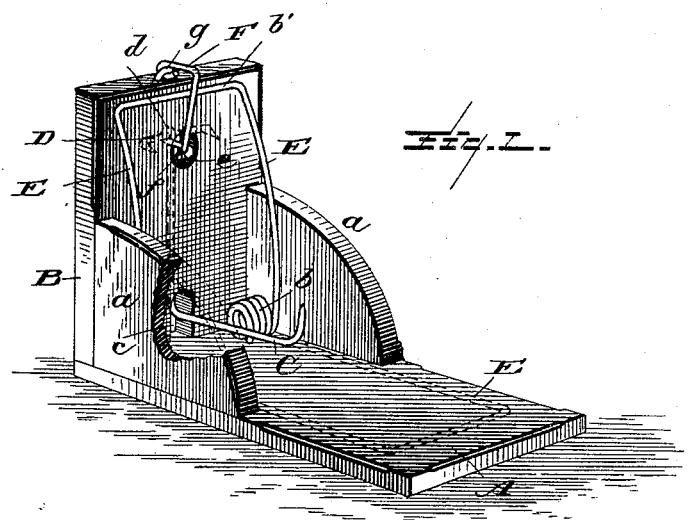
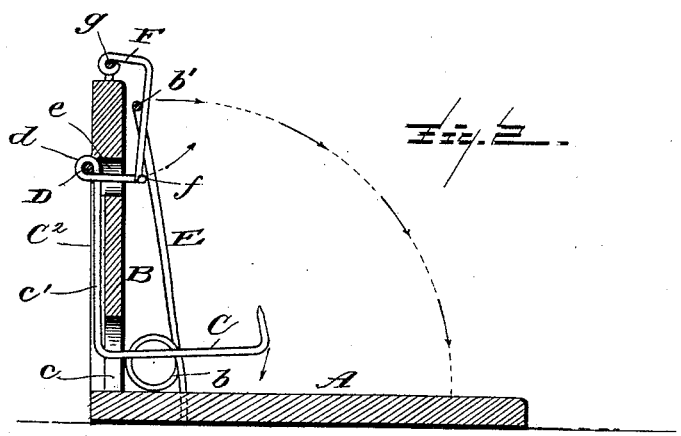
Witnesses
L. C. Hills.
E. H. Bond.
Inventor
Dwight S. Dennis
Admr. of Samuel Dennis.
By
E. B. Stocking
Attorney

UNITED STATES PATENT OFFICE.

DWIGHT S. DENNIS, OF HORNELLSVILLE, NEW YORK, ADMINISTRATOR OF SAMUEL DENNIS, DECEASED.

ANIMAL-TRAP.

SPECIFICATION forming part of Letters Patent No. 437,179, dated September 30, 1890.

Application filed March 3, 1890. Serial No. 342,358. (No model.)

*To all whom it may concern:*

Be it known that I, DWIGHT S. DENNIS, a citizen of the United States, residing in the city of Hornellsville, in the county of Steuben, State of New York, have been duly appointed, in accordance with the law of the State of New York, administrator of the estate of SAMUEL DENNIS, (now deceased), the inventor of certain new and useful Improvements in Animal-Traps, of which the following is a specification, reference being had therein to the accompanying drawings.

This invention relates to certain new and useful improvements in animal-traps; and it has for its object to provide a simple, cheap, and efficient trap composed of few parts and very positive in its action. The bait-holder is formed integral with the locking-arm that serves to hold the trap set, so that touching of the bait is sure to spring the trap. The vertical portion of the bait-holder and locking-arm is set in a recess in the body of the trap to prevent springing of the trap by accidental contact with the same.

Other objects and advantages of the invention will hereinafter appear, and the novel features thereof will be specifically pointed out in the appended claims.

The invention is clearly illustrated in the accompanying drawings, which, with the letters of reference marked thereon, form a part of this specification, and in which—

Figure 1 is a perspective of the improved trap with a portion broken away. Fig. 2 is a vertical longitudinal section through the same.

Like letters of reference indicate like parts in both figures.

Referring now to the details of the drawings by letter, A designates a suitable base, to which is secured the vertical back plate B and, preferably, the side pieces $a$, which serve to form a sort of chamber; but these side pieces may sometimes be omitted, if desired, as shown in Fig. 2.

E is the spring, having its ends secured in the base and formed with coils $b$ and a bail $b'$, as shown best in Fig. 1.

C is the bait-holder. It is formed of wire, one end of which is extended through an opening $c$ in the lower portion of the back plate, and is extended substantially parallel with the base, having its extreme end bent upward and somewhat sharpened to facilitate the affixing of the bait thereon. This wire is bent to form a vertical portion $c'$, which is seated in a groove or recess $c^2$ in the rear face of the back plate, so as to be protected thereby, and thus prevented from being moved by accidental contact therewith and spring the trap. At the upper end of this recess the wire is bent into the form of an eye $d$, which is sleeved loosely on the cross-piece or staple D, and the free end extends horizontally through an opening $e$ in the back plate at the upper end of this vertical recess. This free end has a lateral bend to form a locking-piece $f$. (Seen best in Fig. 1.)

F is the latch, secured to the upper end of the back plate by means of a suitable staple $g$ or other analogous device.

In practice the parts are set in the manner shown, the bail being brought into a vertical position and the latch brought down over the cross-bar of the bail and engaged with the locking-piece of the free end of the wire that forms the bait-holder. Any attempt to steal the bait moves the holder, and this being rigid with the locking-piece is sure to disturb the latter and spring the trap.

What is claimed as new is—

1. In an animal-trap, the combination, with the base and back plate, of the bait-holder and locking-piece passed through openings in the back plate upon different vertical planes and formed of a single piece of wire bent into the shape shown and a locking-latch pivoted to the top of the back plate, as set forth.

2. The combination, with the base and back plate formed with a vertical groove upon its rear face and an opening through the back plate near each end of the groove, of the spring and the bait-holder having a vertical portion integral therewith and seated in said groove and at its upper end formed into a locking-piece, as and for the purpose specified.

3. The animal-trap described, composed of the base and back plates, the latter formed with a vertical groove upon its rear face, the spring secured to the base, the latch secured to the back plate, and the bait-holder formed of a piece of wire having its lower portion extended horizontally with a bent-up end and having a vertical portion seated in the groove in the back plate and at its upper end a horizontal portion extended through a hole in the back plate and formed into a locking-piece engaging the latch, substantially as shown and described.

In testimony whereof I affix my signature in presence of two witnesses.

DWIGHT S. DENNIS,
*Administrator of Samuel Dennis, deceased.*

In presence of—
LEWIS H. CLARK,
PHILIP SCHAUL.